Oct. 18, 1932.  O. U. ZERK  1,883,273
LUBRICATING SYSTEM
Filed Dec. 31, 1926   2 Sheets-Sheet 1

Inventor
Oscar U. Zerk
By Williams, Bradbury,
McCaul & Pickle
Attys.

Oct. 18, 1932.   O. U. ZERK   1,883,273
LUBRICATING SYSTEM
Filed Dec. 31, 1926   2 Sheets-Sheet 2
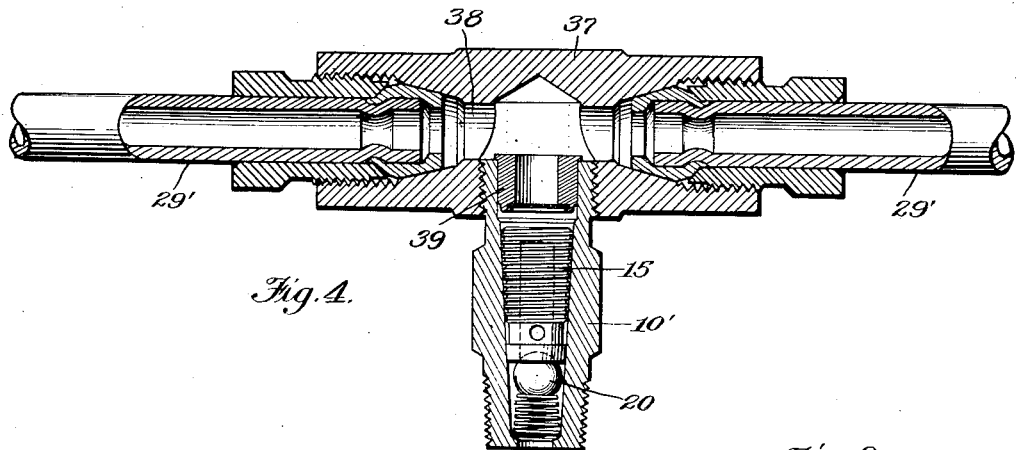
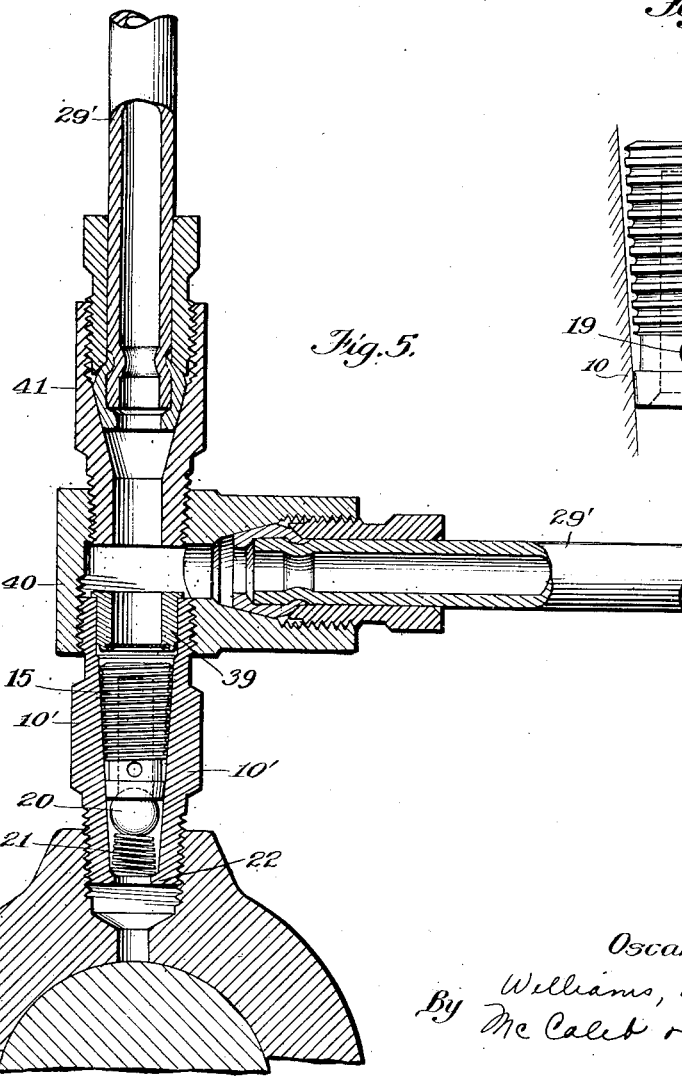
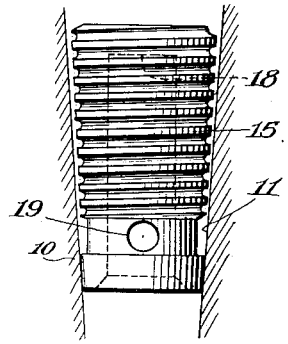
Inventor
Oscar U. Zerk
By Williams, Bradbury,
McCaleb & Hinkle
Attys.

Patented Oct. 18, 1932

1,883,273

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING SYSTEM

Application filed December 31, 1926. Serial No. 158,155.

My invention relates to improvements in lubricating systems and is particularly concerned with improvements in lubricating systems of the so-called centralized type.

A typical or conventional centralized lubricating system comprises a central source of lubricant from which extend one or more conduits that usually terminate in branches leading to the several bearings to be lubricated. Because of the fact that the resistance to the flow of lubricant in the various bearings of an automobile chassis for which this system is especially adaptable, varies greatly, it is necessary to provide some means to insure the proper supply of lubricant to each and all of the bearings irrespective of their resistances.

In some systems this takes the form of an additional resistance, usually referred to as a resistance unit, that is used for connecting each of the branch conduits of the main distributing system with its respective bearings.

My present invention relates particularly to the construction of the resistance units used in such a system.

An object of my invention is to provide a resistance unit in which, while the resistance to the flow of lubricant is high, the passageways are of comparatively large cross-section and so constructed and arranged as to make it unlikely that they should become stopped up with dirt or lint contained in the lubricating oil.

Another object is to provide a resistance unit, the parts of which can easily be assembled by means of automatic machinery.

Another object is to provide a resistance unit comprising a resistance element that is simple in construction but efficient in producing an elongated passageway for offering higher resistance to the passage of oil, but of comparatively large cross-section.

Another object is to provide a resistance unit comprising a sleeve having a bore therein and a resistance element having a grooved external surface for co-acting with the wall of the bore to produce a resistance passageway, the resistance element being of such construction as to insure against any leakage along the periphery of the resistance element.

Another object is to provide a resistance unit comprising novel means for securing thereto the end of the pipe that is to supply it with oil.

A further object is to provide a resistance unit that is simple in construction, efficient in operation and economical to manufacture and assemble.

Other objects and advantages of my invention will appear as this description progresses, reference being had to the accompanying drawings, in which:

Figure 3 is a sectional detail, partly in elevation, showing the expedient I employ for insuring tight contact between the external periphery of the resistance element and the bore of the sleeve;

Figure 4 is a longitudinal section through a modified form of my invention; and

Figure 5 is a similar view through another modification.

Figure 1:
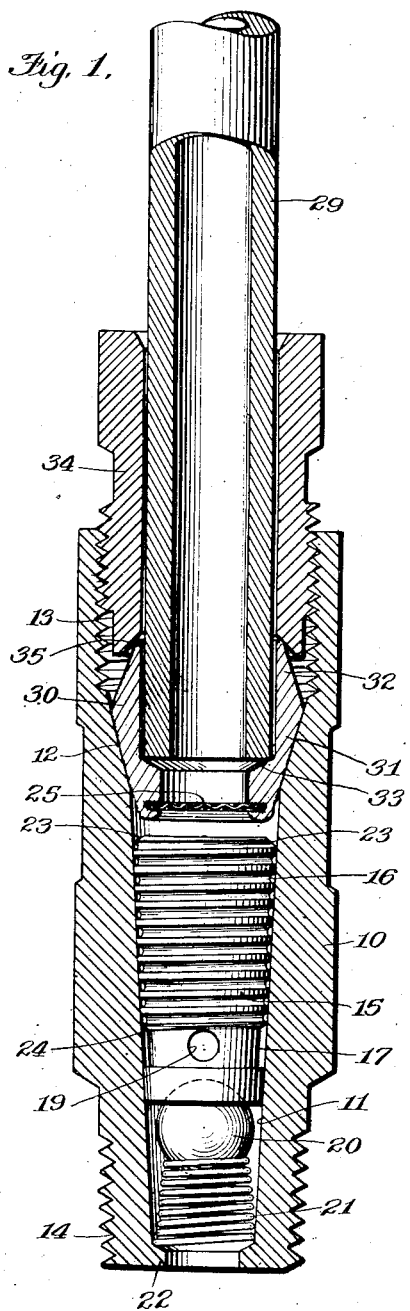
Figure 1 is a longitudinal section through a resistance unit embodying my invention, the resistance element being shown in elevation and the pipe connecting means being shown in their initial position.
Figure 2:
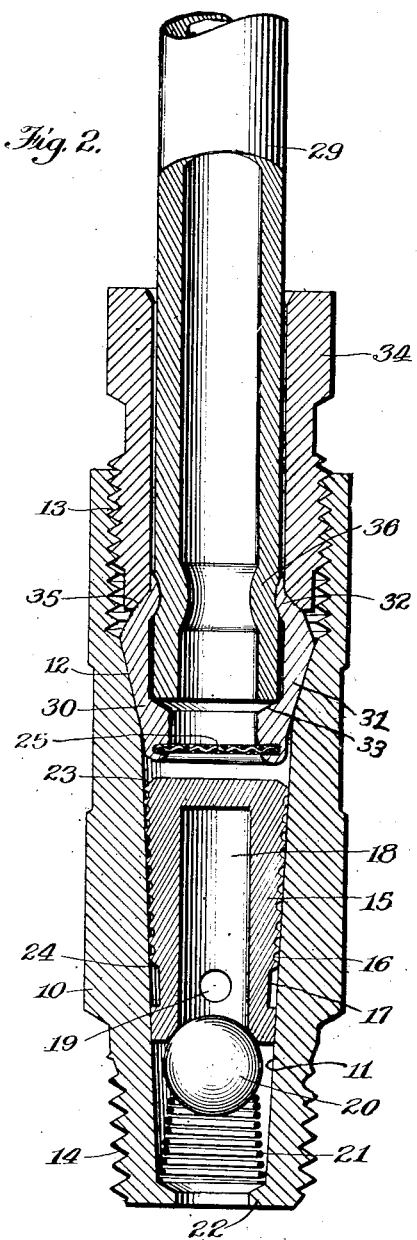
Figure 2 is another longitudinal section in which the pipe connecting means are shown in their final position.

Referring to Figures 1 to 3 inclusive, I have shown my improved resistance unit as comprising a sleeve 10 having a tapered bore 11 formed therein. At its upper end this bore has a more pronounced taper 12 and the extreme upper, or outer, end of the sleeve is internally threaded, as shown at 13. The opposite end of the sleeve is externally threaded, as shown at 14, to provide means for attaching the unit to a bearing to be lubricated. A resistance element 15 is inserted in the tapered portion 11 of the sleeve 10 and has a spiral groove 16 formed in its periphery, the lower end of which communicates with an annular groove 17 formed in the outer wall of the resistance element. A bore 18 is formed longitudinally of the resistance element and opens through the inner end of the latter. Communication between this bore and the groove 17 is provided by means of one or more radially extending openings 19.

In order to permit the resistance element to be forced into the tapered bore without injury to the ridge-like surface of said element and to insure the tight fitting of the resistance element in the bore so that no oil can leak past the periphery of the resistance element without passing through the entire length of the passageway, I prefer to make the taper of the resistance element somewhat slighter than that of the bore, as indicated in Figure 3, so that when it is pushed downwardly or inwardly into the sleeve, the thin walls of the resistance element will be diametrically contracted and a tight fit for the entire length of the resistance element thus secured.

In order to prevent any return flow, or siphoning of oil back through the resistance element and conduit leading thereto, I provide a ball check valve 20 which seats upon the open end of the bore 18 and is held in place by the spring 21, one end of which engages the check valve 20 and the other end of which engages the inturned flange 22 at the inner end of the sleeve 10.

To insure clear passageway for the oil through the resistance element, I prefer to bevel the outer end, as shown at 23, with preferably 45° bevel, and also to bevel that portion 24 of the resistance element that marks the inner end of the groove. This removes any burrs which may have formed during the machining of the resistance element and insures an absolutely clear passageway for the oil.

For securing the end of the conduit 29 to the sleeve 10 I provide a compression sleeve 30, having an inner tapered portion 31 that tightly fits the portion 12 of the bore of the sleeve 10. The outer end of the sleeve 30 tapers to a comparatively thin edge, as shown at 32. The inner end of the sleeve 30 is provided with an inwardly extending annular flange 33 that forms an abutment for the end of the pipe 29 and limits the extent to which it can be inserted in the resistance unit. An externally threaded follower 34 screws into the internally threaded portion 13 of the sleeve 10 and its inner end is beveled, as shown at 35, to provide an annular surface which, when the follower 34 is screwed into the sleeve 10, will deform the thin edge of the compression sleeve into the shape shown in Figure 2, at the same time forming a corresponding annular bead 36, and thus interlocking the pipe and the compression sleeve to such an extent that it is practically impossible to withdraw the pipe without first having removed the follower.

It will be noted that by providing a comparatively large friction contact between the inner beveled portion of the compression sleeve and the wall of the bore 12, the friction between these parts is much greater than the friction between the end of the follower and the outer end of the compression sleeve 30, so that there is no tendency of the compression sleeve to rotate with the follower.

In addition it will be noted that the shapes of the compression sleeve and the co-acting portions of the sleeve 10 are such that it is impossible for the compression sleeve 30 to become disposed transversely of the bore of the sleeve 10, and that it will, under practically all conditions, assume the position shown in Figure 1.

A filter element 25 is placed just above the resistance element 15 and prevents any dirt or other lumpy substance which may be carried by the oil, from reaching and possibly clogging the passageway in the resistance element. In the embodiment disclosed in Figures 1 and 2, the lower or inner end of the sleeve 30 is shown as extended for some distance beyond the flange 33 and provided with an annular groove for holding the fine metal screen which constitutes the filtering element.

In Figure 4 I have shown a modified form of my invention in which the outer end of the sleeve 10' is threaded into a second sleeve 37 which sleeve is provided with a longitudinal bore 38 threaded at each end for the reception of an end of a conduit 29' which is held in place and connected with the sleeve 37 by means similar to that described above. In this construction a separate filtering element is used, this filtering element 39 comprising a fine metal screen, supported in the end of an independent tubular supporting member which is driven into the part of the sleeve 10' which extends beyond the larger end of the resistance element.

In this construction oil can flow into the sleeve 37 through one pipe 29' and out through the other pipe 29'. As long as the oil in these two conduits is under pressure, oil will be forced through the filter 39 and past the resistance element 15 and the check valve 20, just as in the construction shown in Figures 1 and 2. The pipe 29' that leads the oil away from the sleeve 37 may continue on and supply oil to one, or a plurality, of additional resistance units.

The construction shown in Figure 5 is similar to that shown in Figure 4, except that here the two conduits 29' extend at right angles to each other. The outer end of the sleeve 10' is threaded into a T-shaped fitting 40, in one end of which is secured one of the pipes 29' and a fitting 41, screwed into the fitting 40, provides means for securing the other pipe 29'. In this case, as in the case of Figure 4, the oil can enter and leave through either of the pipes 29'.

While I have described the details of construction of the preferred embodiment of my invention, it is to be clearly understood that my invention is not limited to these details but is capable of other adaptations and modifications within the scope of the appended claims.

Having thus described my invention, what I claim is:

1. A resistance unit comprising a sleeve having a tapered bore therein, a resistance element having its outer wall tapered to make tight contact with the bore of said sleeve, the outer wall of said resistance element having a spiral groove formed therein and extending from its outer end to a point adjacent to, but not at, its inner end, said resistance element having a longitudinal bore opening through its inner end and an opening through the wall of said resistance element for connecting said longitudinal bore with said spiral groove, a check valve seating in the open end of said longitudinal bore, and a spring for holding said check valve on its seat.

2. A resistance unit comprising a sleeve having a tapered bore therein, a resistance element having its outer wall tapered to make tight contact with the bore of said sleeve, the outer wall of said resistance element having a spiral groove formed therein and extending from its outer end to a point adjacent to, but not at, its inner end, said resistance element having a longitudinal bore opening through its inner end and an opening through the wall of said resistance element for connecting said longitudinal bore with said spiral groove.

3. A resistance unit comprising a sleeve having a bore therein, a resistance element inserted in said bore and having tight contact with the walls of said bore, said resistance element having a spiral groove formed in its outer wall and a longitudinal bore extending from its inner end to a point intermediate its ends, means for establishing communication between said groove and said bore, a check valve seating in the open end of said bore, and a spring for holding said check valve on its seat.

4. A resistance unit comprising a sleeve having a bore therein and a resistance element inserted in said bore and having a tight contact with the walls of said bore, said resistance element having a spiral groove formed in its outer wall and a longitudinal bore extending from its inner end to a point intermediate its ends, and means connecting said bore and groove.

5. A resistance unit comprising a sleeve having a bore, a resistance element inserted in said bore and co-acting with said sleeve to form a passageway extending from the outer end of said resistance element to a point adjacent the inner end of said resistance element, said resistance element having a passageway extending from its inner end toward its outer end, means connecting said passageways and a check valve for closing the discharge end of said last named passageway.

6. A resistance unit comprising a sleeve having a bore and a resistance element inserted in said bore and co-acting with said sleeve to form a passageway extending from the outer end of said resistance element to a point adjacent the inner end of said resistance element, said resistance element having a passageway extending from its inner end toward its outer end and communicating with said first-named passageway.

7. A resistance unit comprising a sleeve having a bore and a resistance element inserted in said bore and co-acting with said sleeve to form a passageway extending from the outer end of said resistance element to a point adjacent to, but not at, the inner end of said resistance element, said resistance element having a passageway extending from said first named passageway to the inner end of said element.

8. A resistance element comprising a truncated cone having a spiral groove formed in its outer periphery and an annular groove formed in its outer periphery adjacent one end, said spiral groove terminating in said annular groove, said resistance element having a longitudinal bore, opening through its smaller end, and a passageway for establishing communication between said annular groove and said bore, said resistance element having a circumferential bevel at each end of the spiral groove.

9. A resistance element comprising a truncated cone having a spiral groove formed in its outer periphery and an annular groove formed in its outer periphery adjacent one end, said spiral groove terminating in said annular groove, said resistance element having a longitudinal bore, opening through its smaller end, and a passageway for establishing communication between said annular groove and said bore.

10. A resistance element comprising a truncated cone having a spiral groove formed in its outer periphery and a longitudinal bore opening through its smaller end, said resistance element having, also, a passageway for establishing communication between one end of said spiral groove and said bore.

11. A resistance element comprising a body of revolution having a groove extending from one end around said body to a point adjacent the other end and also having a longitudinal bore communicating with said groove.

12. A resistance unit comprising a sleeve having a bore, a resistance element comprising a body of revolution having a groove extending from one end around said body to a point adjacent the other end and also having a longitudinal bore and a passageway joining the two, a compression sleeve adjacent said resistance element and having an inner tapered portion for frictional contact with the wall of said tapered bore, the outer end of said compression sleeve also being tapered to a comparatively thin edge, a follower threaded into the outer end of said first named sleeve and having a beveled counter-bore for contacting with the outer end of said compression sleeve and swedging it inwardly to engage the outer wall of the pipe that is to be connected with said resistance unit, and a filtering element carried by said sleeve and in close proximity to said resistance element to prevent clogging of said element by foreign bodies.

13. A resistance unit comprising a sleeve having a tapered bore therein, a resistance element inserted in said bore and having a spiral groove therein, a communicating passage between said bore and said groove, a check valve cooperating with said resistance element, a compression sleeve mounted in the bore of said first named sleeve and adapted to receive the end of a conduit, a follower for interlocking said compression sleeve and said conduit, and a filtering element carried by said compression sleeve and adjacent said resistance element to prevent foreign bodies passing through said conduit from clogging said resistance element.

In witness whereof I hereunto subscribe my name this 20 day of December, 1926.

OSCAR U. ZERK.